United States Patent
Greenwalt et al.

(10) Patent No.: US 9,712,337 B2
(45) Date of Patent: Jul. 18, 2017

(54) EMPLOYING POWER OVER ETHERNET FOR AUXILIARY POWER IN COMPUTER SYSTEMS

(71) Applicant: Intel Corporation, Santa Clara, CA (US)

(72) Inventors: Paul Greenwalt, Beaverton, OR (US); Patrick Connor, Beaverton, OR (US); Scott P. Dubal, Beaverton, OR (US); Chris Pavlas, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 711 days.

(21) Appl. No.: 13/786,611

(22) Filed: Mar. 6, 2013

(65) Prior Publication Data
US 2014/0258738 A1 Sep. 11, 2014

(51) Int. Cl.
G06F 1/26 (2006.01)
H04L 12/40 (2006.01)
G06F 1/32 (2006.01)

(52) U.S. Cl.
CPC ...... *H04L 12/40045* (2013.01); *G06F 1/3206* (2013.01); *G06F 1/3278* (2013.01); *Y02B 60/126* (2013.01)

(58) Field of Classification Search
CPC ........................................................ G06F 1/26
See application file for complete search history.

(56) References Cited

U.S. PATENT DOCUMENTS

| | | | |
|---|---|---|---|
| 2007/0079151 A1* | 4/2007 | Connor et al. | 713/300 |
| 2007/0223520 A1* | 9/2007 | Diab | H04L 12/10 370/463 |
| 2009/0164805 A1* | 6/2009 | Diab | G06F 1/26 713/300 |
| 2009/0217062 A1* | 8/2009 | Diab | G06F 1/266 713/310 |
| 2009/0217088 A1* | 8/2009 | Diab | G06F 11/2015 714/14 |
| 2010/0299548 A1* | 11/2010 | Chadirchi et al. | 713/340 |
| 2011/0125341 A1* | 5/2011 | Heath et al. | 700/295 |

(Continued)

*Primary Examiner* — Thomas Lee
*Assistant Examiner* — Chad Erdman
(74) *Attorney, Agent, or Firm* — Law Office of R. Alan Burnett, PS

(57) ABSTRACT

Methods and apparatus for implementing Power over Ethernet (PoE) for auxiliary power in computer systems. Under aspects of the methods, one or more voltage inputs comprising standard power input is employed by a power control component in a network interface in an apparatus such as a network adaptor board, a System on a Chip (SoC), computer server or server blade to supply power to a network controller on the apparatus when the apparatus is operating at a normal power state. To enable the apparatus to maintain network communication when operating at a reduced power state, a PoE power input derived from at least one PoE signal received at at least one Ethernet jack of the apparatus is employed to provide power to the network controller absent use or availability of the standard power input. Accordingly, the PoE power input facilitates an auxiliary power function that may be used alone or in combination with existing (as applicable) auxiliary power input when apparatus are operated in reduced power states.

32 Claims, 14 Drawing Sheets

(56) References Cited

U.S. PATENT DOCUMENTS

2011/0241425 A1* 10/2011 Hunter, Jr. .............. H04L 12/10
 307/39
2013/0339760 A1* 12/2013 Zimmerman et al. ........ 713/300

* cited by examiner

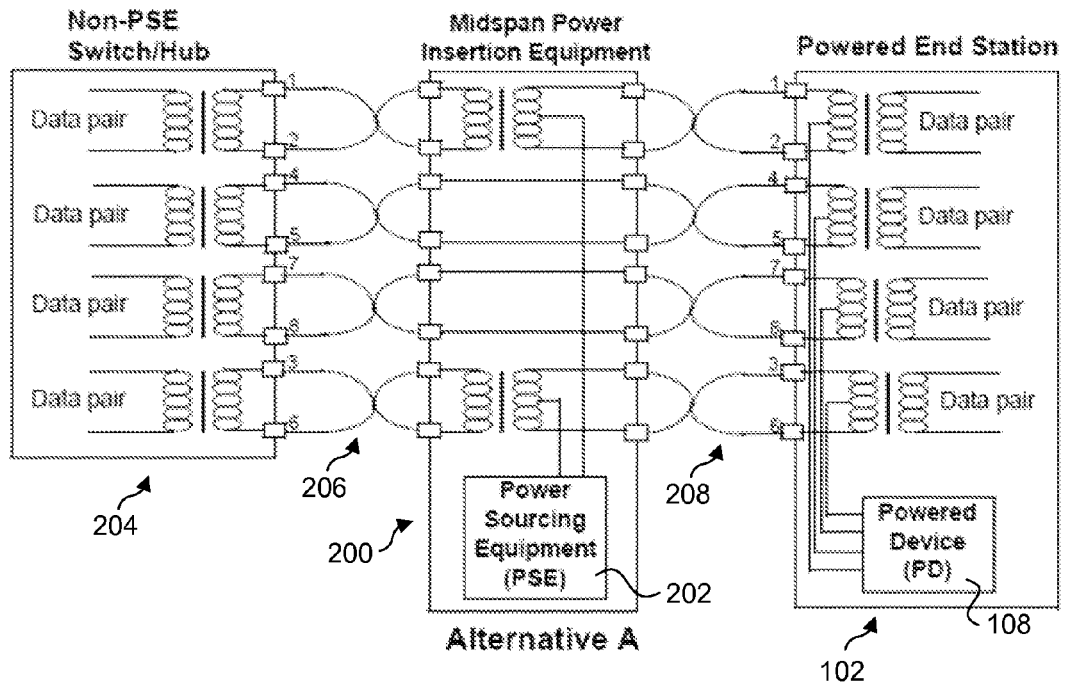
Fig. 2a *(Prior Art)*
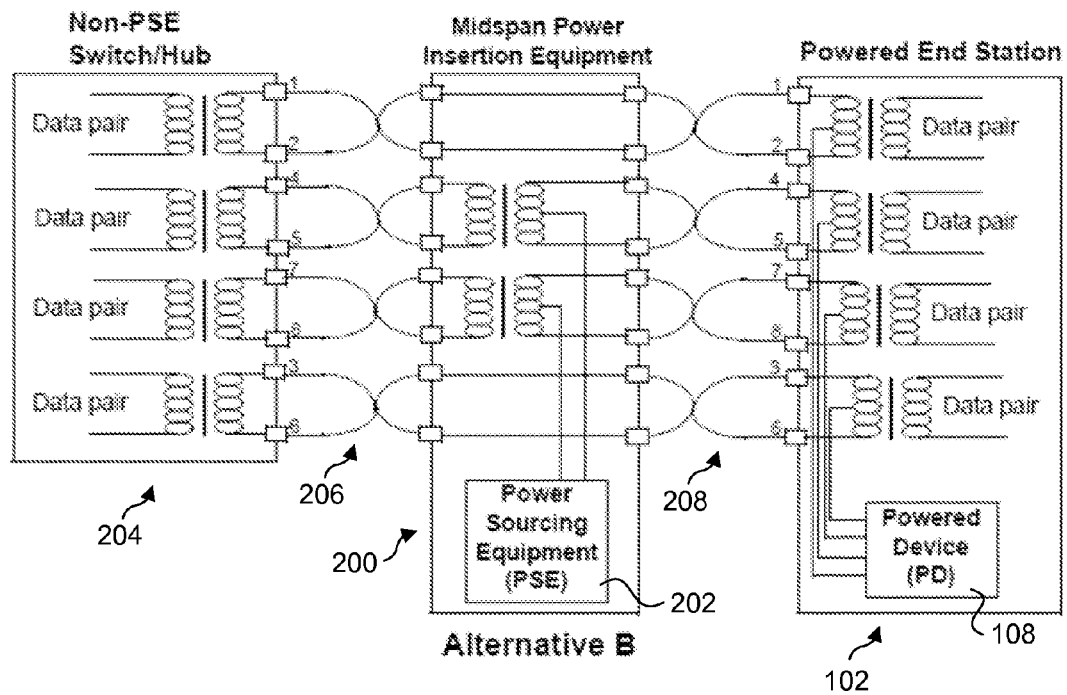
Fig. 2b *(Prior Art)*

EMPLOYING POWER OVER ETHERNET FOR AUXILIARY POWER IN COMPUTER SYSTEMS

FIELD OF THE INVENTION

The field of invention relates generally to power-related aspects of computer systems and, more specifically but not exclusively relates to techniques for providing and/or supplementing auxiliary power in computer systems via Power over Ethernet connections.

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has lead to even further usage of computer networks, and these services are forecast to become ever-more prevalent.

Expansion of network usage, particularly via cloud-based services, as been facilitated via substantial increases in network bandwidths and processor capabilities. For example, broadband network backbones typically support bandwidths of 10 Gigabits per second (Gbps) or more, while the standard for today's personal computers is a network interface designed to support a 1 Gbps Ethernet link. On the processor side, processors capabilities have been increased through both faster clock rates and use of more than one processor core. For instance, today's PCs typically employ a dual-core processor or a quad-core processor, while servers may employ processors with even more cores. For some classes of servers, it is common to employ multiple processors to enhance performance. In addition, it is envisioned that much if not most of the future processor performance increases will result from architectures employing greater numbers of cores, and that future servers may employ greater numbers of processors.

One of the primary considerations in data center implementations is power consumption. In addition to the financial cost of power, a significant aspect of data center power consumption relates to cooling. Under a typical data center design, multiple high-density server racks are arrayed in rows, with each server rack comprising multiple blade servers, each with its own set of server blades. In other configurations, server racks may house multiple stand-alone servers, such a 1 U, 2 U and 4 U rack-mounted servers. In the case of server blades, each blade typically has one or more multi-core processors and its own memory and networking resources.

Generally, the workload supported by a data center will vary throughout a day, with higher workloads present during normal working hours, with lower workloads during nights and weekends. In order to support such variable workloads, data centers are configuration to be dynamically scaled. Recent advances in processor and system architectures enable computer systems such as server blades and stand-alone servers to be put into lower-power idle states or sleep states. This is the preferred scheme for temporarily taking server resources offline rather than shutting servers down. The amount of power consumption when in an idle or sleep state is relatively low, particularly when put in a deep sleep state (e.g., a hibernation mode or standby mode).

Modern servers often are configured with a baseboard management controller (BMC) or the like. A BMC can be accessed via a remote management facility over a computer network, enabling remote management of an individual server or set of servers (e.g., a BMC in a management board in a blade server rack). In order to support BMC availability, network communications need to be enabled, including while a server is operating in a lower power state. Power for a network controller or the like is typically provided from a system or rack power supply, either as a normal power signal or an auxiliary power signal. Currently, 10 Gigabit Ethernet (GbE) network adaptor power requirements may exceed the standby power level supplied by some standard bus/interconnects, such as available via Peripheral Component Interconnect Express (PCIe) buses. Therefore, 10 GbE network adapters have required use of a separate auxiliary power supply when their host systems are operating in reduced power states.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 2a and 2b illustrate two alternative configurations for implementing PoE+ using PSE in a midspan device for a 1000BASE-T Ethernet end station, as defined by IEEE 802.3at-2009;

FIG. 5b is a rear isometric view of the blade server chassis of FIG. 16a;

DETAILED DESCRIPTION

Figure 1A:
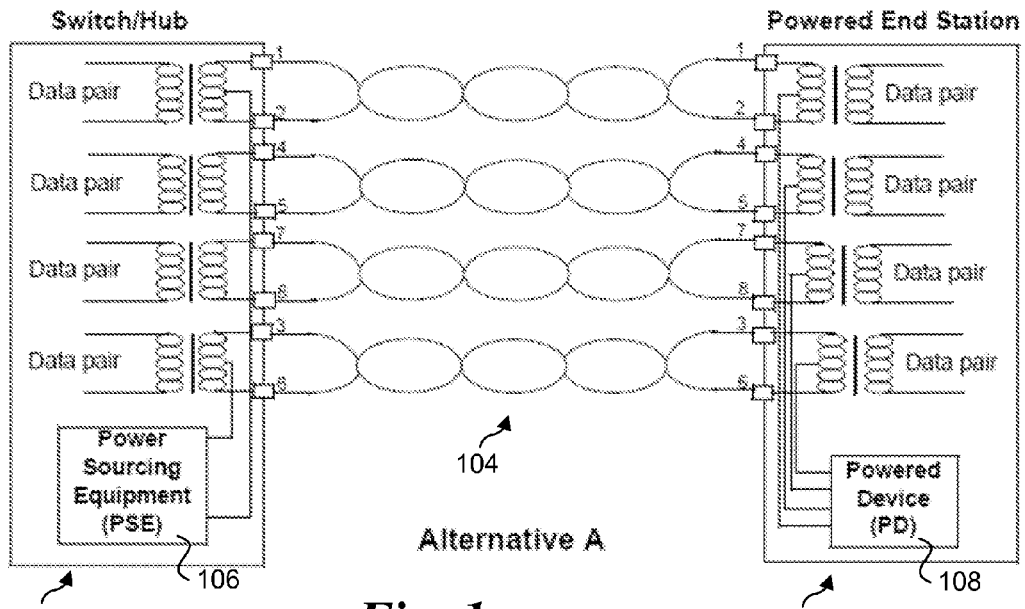
FIGS. 1a and 1b illustrate two alternative configurations for implementing PoE+ using PSE in a networking device such as a switch or hub for a 1000BASE-T Ethernet end station, as defined by IEEE 802.3at-2009.

Embodiments of methods and apparatus for implementing Power over Ethernet for auxiliary power in computer systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments disclosed herein, Power over Ethernet (PoE) technology is combined with novel power control techniques to enable a network controller or the like to remain active or awaken on demand without requiring standard power to be supplied to the network controller via conventional power sources when a host computer system or server is operating in a low-power state. This results in a reduction in the power consumption of the computer system when operating in a lower-power state. When implemented in a data center, this combined power savings across a large number of servers is significant, thus substantially reducing data center operating costs and heat generation.

Power over Ethernet technology facilities combining both power and Ethernet communication signals to end devices using conventional Ethernet cabling. Power is supplied in common mode over two or more of the differential pairs of wires found in the Ethernet cables and comes from power sourcing equipment (PSE) within a PoE-enabled networking device such as an Ethernet switch or can be injected into a cable run with a midspan power supply.

PoE specifications are defined by corresponding standards developed by the Institute of Electrical and Electronic Engineers (IEEE). The original IEEE 802.3af-2003 PoE standard (also referred to herein as the PoE standard) defines a power level of up to 15.4 W (Watts) of DC power (minimum 44 V (Volts) DC and 350 mA (milliamps)) generated at a PSE for each powered device (PD) implemented in PoE-enabled networking devices employing an active PoE link state. Only 12.95 W is assured to be available at the PD as some power is dissipated in the cable. The updated IEEE 802.3at-2009 PoE standard also known as PoE+ or PoE plus (also referred to herein as the PoE+ standard), provides up to 25.5 W of power to PoE-enabled devices.

Figure 1B:
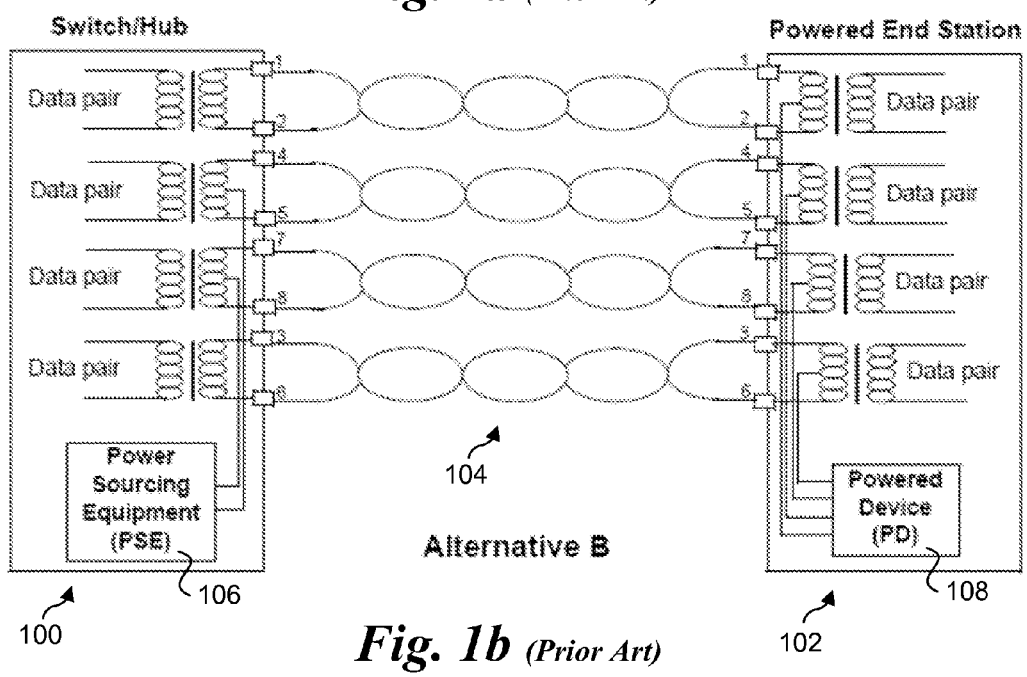

FIGS. 1a and 1b illustrate two alternative configurations for implementing PoE+ using PSE in a networking device such as a switch or hub for a 1000BASE-T Ethernet end station, as defined by IEEE 802.3at-2009. Under each configuration, data is transferred between a switch or hub 100 and a powered end station 102 over an Ethernet cable 104 comprising four twisted pairs of wire, with a minimum of Category (Cat) 5 wiring to support the full 25.5 W power output of PoE+. PoE power is provided via PSE 106 at switch/hub 100 and is consumed via a PD 108 in powered end station 102.

Under the IEEE 802.3at-2009 PoE+ standard, power may be sent over two pairs of wire as a differential DC voltage. As shown in FIGS. 1a and 1b, respectively, the permitted twisted pairs are coupled to signal pins 4-5, 7-8, and 1-2, 3-6 on an RJ-45 Ethernet connector (also commonly referred to as an Ethernet jack). The data signals transmitted by the power-carrying pairs of wire are modulated over the DC voltage, while the data signals on the two other twisted pairs comprise conventional Ethernet data signals at conventional voltage levels.

In addition to implementing a PSE at a switch or hub, a PSE may also be implemented at intermediary device referred to as a midspan device. The two configurations defined by IEEE 802.3at-2009 for 1000BASE-T Ethernet PoE+ implementations employing PSEs in midspan devices are shown in FIGS. 2a and 2b. In each configuration, midspan power insertion equipment 200 including a PSE 202 that is coupled between a non-PSE switch or hub 204 and a powered end station 102 via Ethernet cables 206 and 208. As with the configurations shown in FIGS. 1a and 1b, power may be carried over twisted pairs that are coupled to signal pins 4-5, 7-8, or 1-2, 3-6 on an RJ-45 Ethernet connector.

As used herein each of a PSE-enabled switch or hub or a PSE-enabled midspan device comprises a PoE power sourcing device. More generally, any networking device implementing a PSE and configured to facilitate communication with a powered end station using PoE signals may be defined as a PoE power sourcing device. It is further noted that although a device may be defined as a PoE power sourcing device, it may also facilitate communication via non-PoE Ethernet signals.

Under a conventional Ethernet link between an Ethernet switch or hub and an end station, data is transferred in the following manner. Data is temporarily stored in memory buffers in the switch or hub in a digital form. During outbound transmission, the data is converted into a serial data stream comprising segments called Media Access Channel (MAC) frames (also sometimes called Ethernet frames). The digital MAC frame data is then converted into an analog form by a Physical (PHY) layer. Under the 1000BASE-T (1 Gigabit/second) IEEE standard, the PHY layer uses five-level Pulse Amplitude Modulation (PAM-5) for each twisted pair, using two twisted pairs for each direction to support bi-directional communication over the link. The 10GBASE-T (IEEE 802.3an-2006) standard employs a similar PHY layer (although operating at 10 times the frequency), and preferably employs CAT 6a cables or higher (although CAT 6 and 5e may also be used for shorter cable lengths). Upon reception, the analog PHY layer signal is converted back to a digital stream by PHY and MAC layer components at the link end point (e.g., an Ethernet end station).

Standards-based power over Ethernet is implemented following the specifications in IEEE 802.3af-2003 (which was later incorporated as clause 33 into IEEE 802.3-2005) or the 2009 update, IEEE 802.3at. A "phantom" power technique is used to allow the powered pairs to also carry data. This is possible because all versions of Ethernet over twisted pair cable specify differential data transmission over each pair with transformer coupling; accordingly, the DC supply and load connections can be made to the transformer center-taps at each end. Each pair thus operates in common mode as one side of the DC supply, so two pairs are required to complete the circuit. The polarity of the DC supply may be inverted by crossover cables; under the PoE and PoE+ standards the powered device must operate with either pair: spare pairs 4-5 and 7-8 or data pairs 1-2 and 3-6 (under 1000BASE-T and 10GBASE-T all four twisted pairs are implemented as data pairs).

Under a conventional PoE+ implementation, the signaling and signal processing on the twisted pairs that do not carry the power (i.e., the non-powered signals) is the same as for a conventional Ethernet link. However, signaling and signal processing over the powered signals is a bit different. Rather than employing a nominal baseband DC voltage of 0 volts (with the PAM-5 symbols corresponding to line single levels above, at, and below 0 volts), a nominal differential DC voltage of 48 volts is used (per IEEE 802.3at-2009, this voltage can range from 50.0-57.0 volts at a PSE and 42.5-57.0 volts at a PD). The PAM-5 symbols are modulated over the differential voltage. At the receiving end (e.g., powered end station 102), circuitry is implemented to effectively separate out the PAM-5 encoded data signal from the DC differential voltage through transformer coupling.

Figure 3:
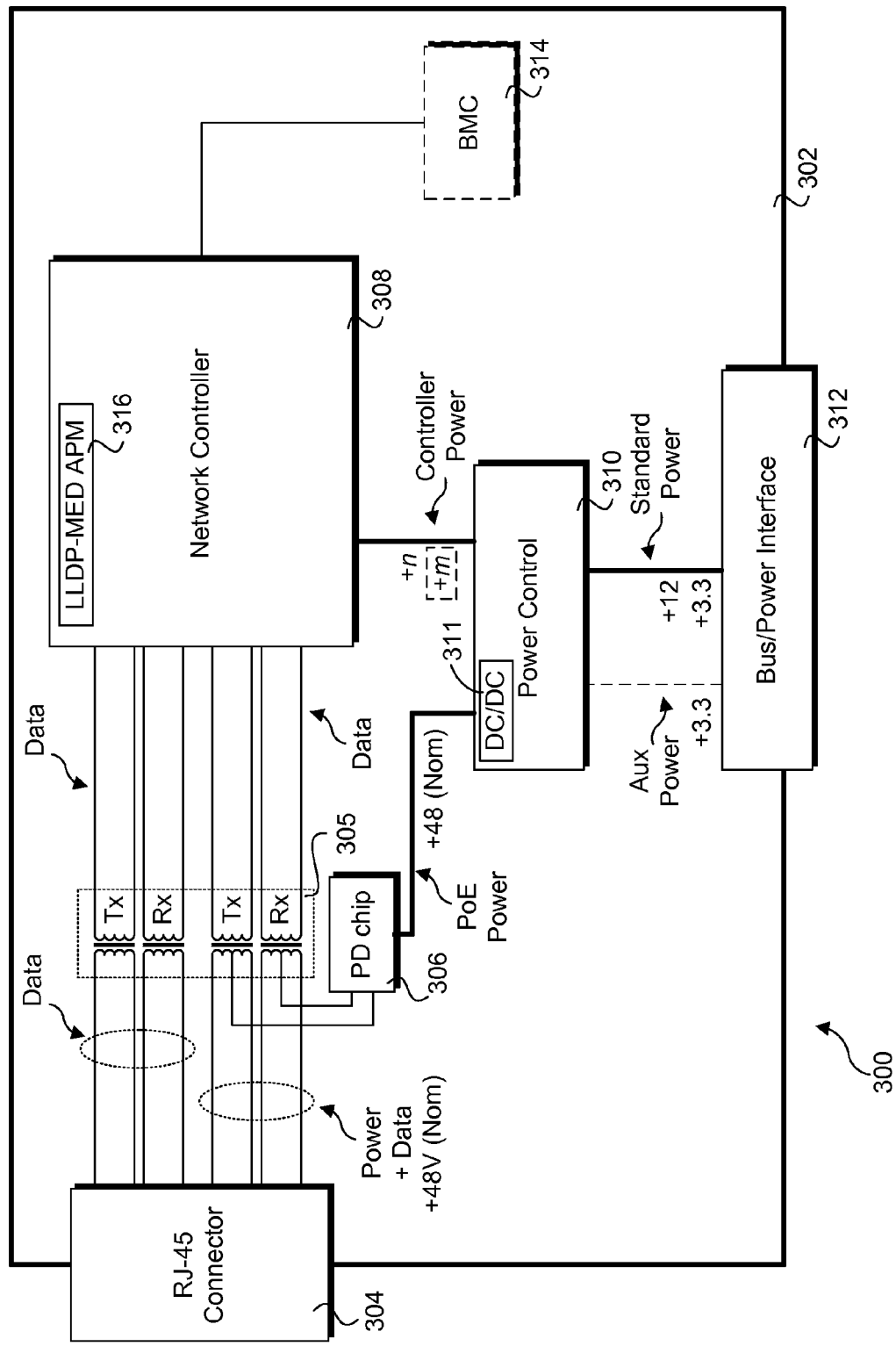
FIG. 3 is a schematic diagram of a network interface architecture configured to implement aspects of PoE or PoE+ in combination with server power state management techniques to facilitate reduction of power consumed by servers when operation in low-power or sleep states while providing sufficient power to applicable networking components, according to one embodiment.

FIG. 3 shows a network interface architecture 300 configured to implement aspects of PoE or PoE+ in combination with server power state management techniques to facilitate even further reduction of power consumed by servers when operation in low-power or sleep states while providing sufficient power to applicable networking components. Network interface architecture 300 includes a main board 302 or substrate having a plurality of components mounted thereon or otherwise coupled thereto, including an RJ-45 connector 304, sets of coupling transformers 305, a PD chip 306, a network controller 308, a power control component or block (power control) 310, a bus/power interface 312, and an optional baseboard management controller (BMC) 314.

During operation, an Ethernet cable comprising four twisted pairs of copper wiring is coupled to RJ-45 connector. In accordance with applicable PoE or PoE+ standards, two of the four twisted pairs (depicted as the lower two pairs in FIG. 3) are used for conveying data signals modulated over a PoE voltage signal, with the other two twisted pairs are used for conveying conventional Ethernet data signals. Coupling transformers 305 are implemented to extract the modulated data signals and the PoE voltage signal, with further signal processing being performed by PHY layer circuitry that may either be provided by network controller 308 or comprises one or more external (to network controller 308) components (not shown).

As discussed above, power-carrying PoE signals can range from 50.0-57.0 volts at a PSE and 42.5-57.0 volts at a PD; for simplicity, power-carrying PoE signals are defined to have a nominal voltage of 48V. In the embodiment illustrated in FIG. 3, the power-carrying PoE voltage signals are coupled at center taps on the windings of a pair transformer coils of transformers 305 to PD chip 306. Alternatively, a separate pair of transformer coils (i.e., separate from the transformer coils used in transformers 305) may be implemented to couple the power-carrying PoE voltage signals to PD chip 306. In turn PD chip 306 is configured to extract and filter the power portion of the PoE power-carrying signals, outputting PoE power at a nominal voltage level of 48V. As will be recognized by those skilled in the art, the actual voltage output by PD chip 306 will be a function of the PoE signal voltage that is received on the input side of the PD chip. The output voltage of PD chip 306 comprises a PoE power output that is received as a power input at power control 310. Circuitry internal or external to power control 310, such as depicted by a DC-to-DC (DC/DC) converter 311, may be used to convert the PoE power input to a lower voltage level and to provide further conditioning of the signal.

Figure 3A:
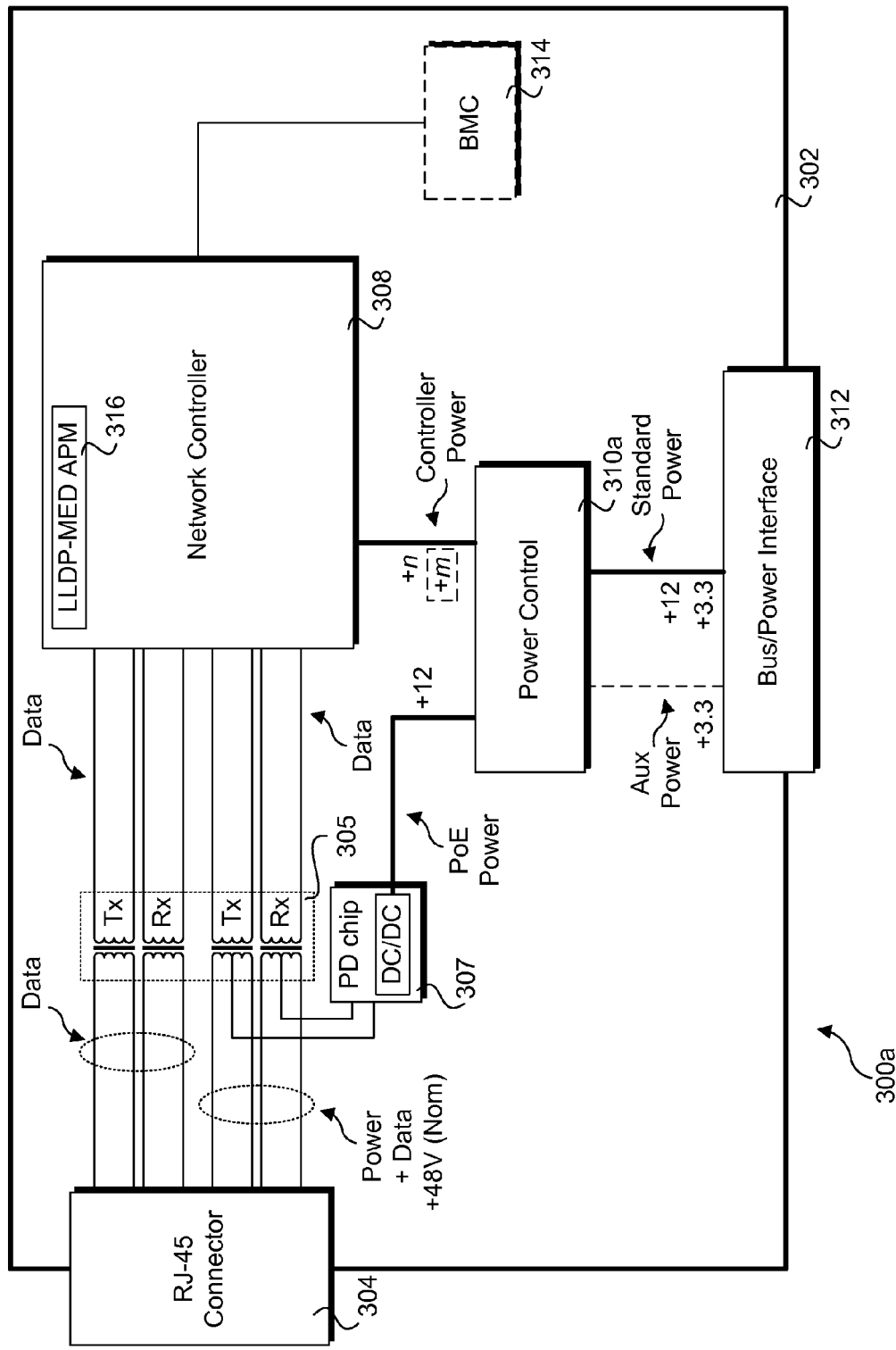
FIG. 3a is a schematic diagram illustrating a modification to the network interface architecture of FIG. 3 under which a DC/DC converter is included in a PD chip.
Figure 3B:
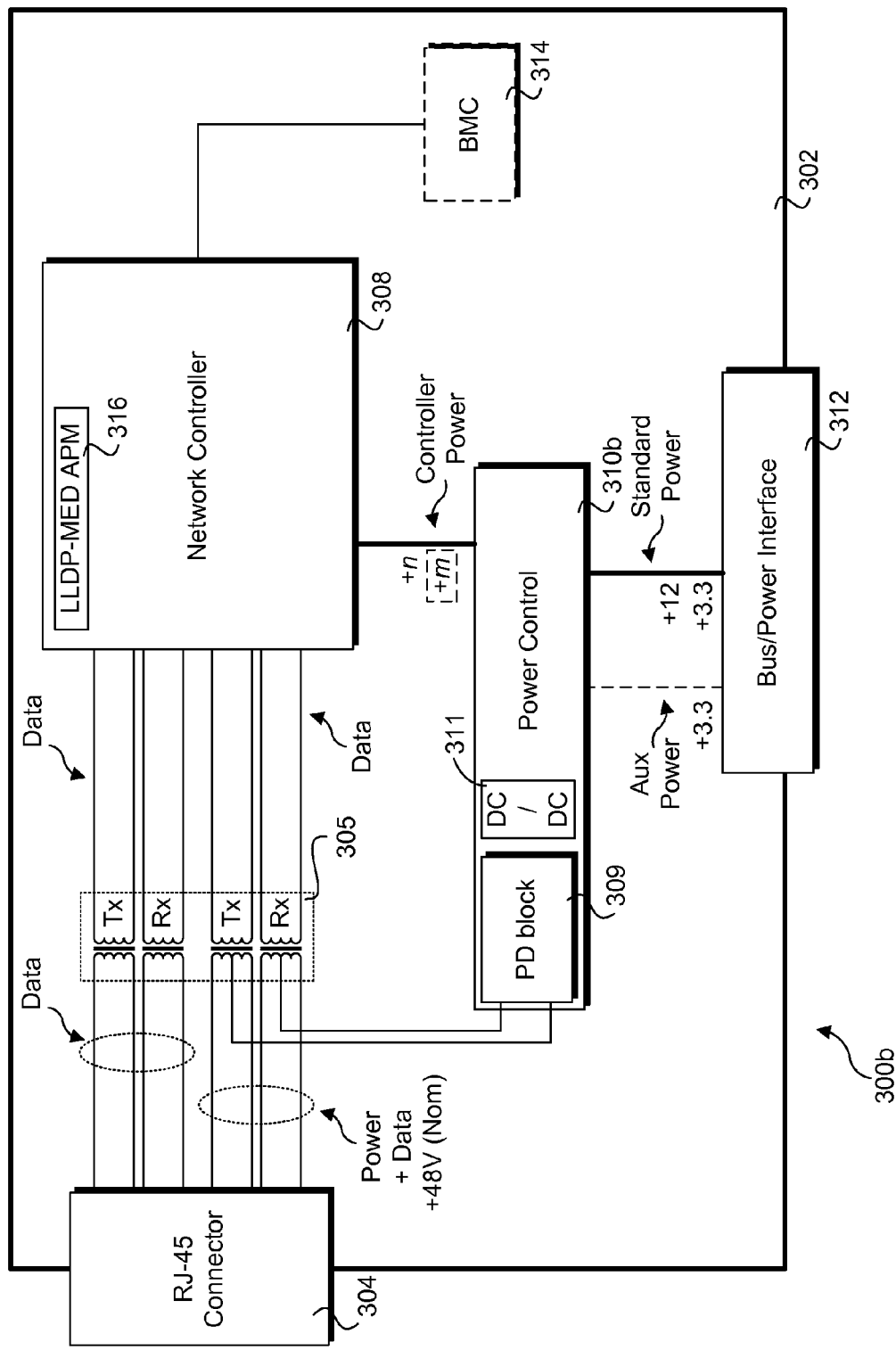
FIG. 3b is a schematic diagram illustrating a modification to the network interface architecture of FIG. 3 under which a PD block is integrated in a power control component.

In addition to employing a DC/DC converter in power control 310, a DC/DC convertor and or other power signal conditioning circuitry may be implemented external to power control 310. For example, FIG. 3a shows an alternative network interface architecture 300a including a PD chip 307 having an internal DC/DC convertor. Under one embodiment of this configuration, the PoE power output from PD chip 307 is a +12V signal, thereby removing the need for a stepdown DC/DC convertor in power control 310a for a power control component that employs a +12V signal for standard power. In another embodiment, the PoE power output from PD chip 307 is has a voltage value that matches the voltage level of either the voltage used for supplying standard power, the auxiliary power voltage, or the voltage level used for the controller power input. As yet another option, circuitry that supports PD functionality may be implemented in the power control component itself, as depicted in a network interface architecture 300b shown in FIG. 3b, wherein a PD block 309 and DC/DC convertor 311 are both integrated in a power control 310b.

In the figures herein, PD chips 306 and 307 are illustrative of pre-packaged PoE and PoE+ PD components that are available from various vendors including but not limited to Texas Instruments, Linear Technology, Maxim Integrated, National Semiconductor, and Silicon Labs. PD block 309 is illustrative of a PD logic/circuit functional block providing similar functionality to a standalone PD chip, wherein the functional block may be designed from scratch or licensed as an Intellectual Property (IP) block from one or more of the foregoing vendors or other vendors that have developed similar PD component designs.

Returning to FIG. 3, during normal operation corresponding to a normal power state, power for the network interface is provided via bus/power interface 312, as depicted by a "Standard Power" signal. For instance, a typical bus has multiple power and ground signals to provide power at multiple voltage levels, such as +3.3.V, +5V, +12V, etc. Various applicable voltage signals are received as (somewhat, depending on the system power supply) unfiltered power inputs by power controller 310, which supplies one or more filtered voltage levels (depicted as controller power comprising a voltage n and an optional voltage m) to network controller 308. For example, power controller 310 may include various passive and/or active power filtering elements to produce the filtered voltage(s) comprising the controller power output that is employed as a power input by network controller 308.

In one embodiment, during some low-power operations external input power may be provided as auxiliary power (Aux Power) input to power control 310. The auxiliary power input will typically be provided at one voltage level (e.g., +3.3V) as an unfiltered or filtered voltage signal, which may be filtered (as appropriate) by applicable power conditioning circuitry in power control 310 (not shown). The foregoing Standard Power and Aux Power operation modes comprise conventional power input modes implemented in some of today's servers and networking cards.

In additional to the foregoing conventional operational modes, network interface architectures 300, 300a, and 300b also support one or more PoE operational modes. By way of illustration, some embodiments are shown and discussed below with reference to network interface architecture 300; however, it will be understood that similar PoE operational modes may be implemented using network interface architectures 300a and 300b, as well as variations of these architectures.

Under various power input modes, the following single or combinations of power inputs may be implemented for each of network interface architectures 300, 300a and 300b:

1. Standard Power (only);
2. Standard Power+PoE power;
3. PoE power (only); and
4. PoE power+Aux Power.

In addition, Aux Power may be further added as an optional additional input for power inputs 1, 2, or 3.

Figure 3C:
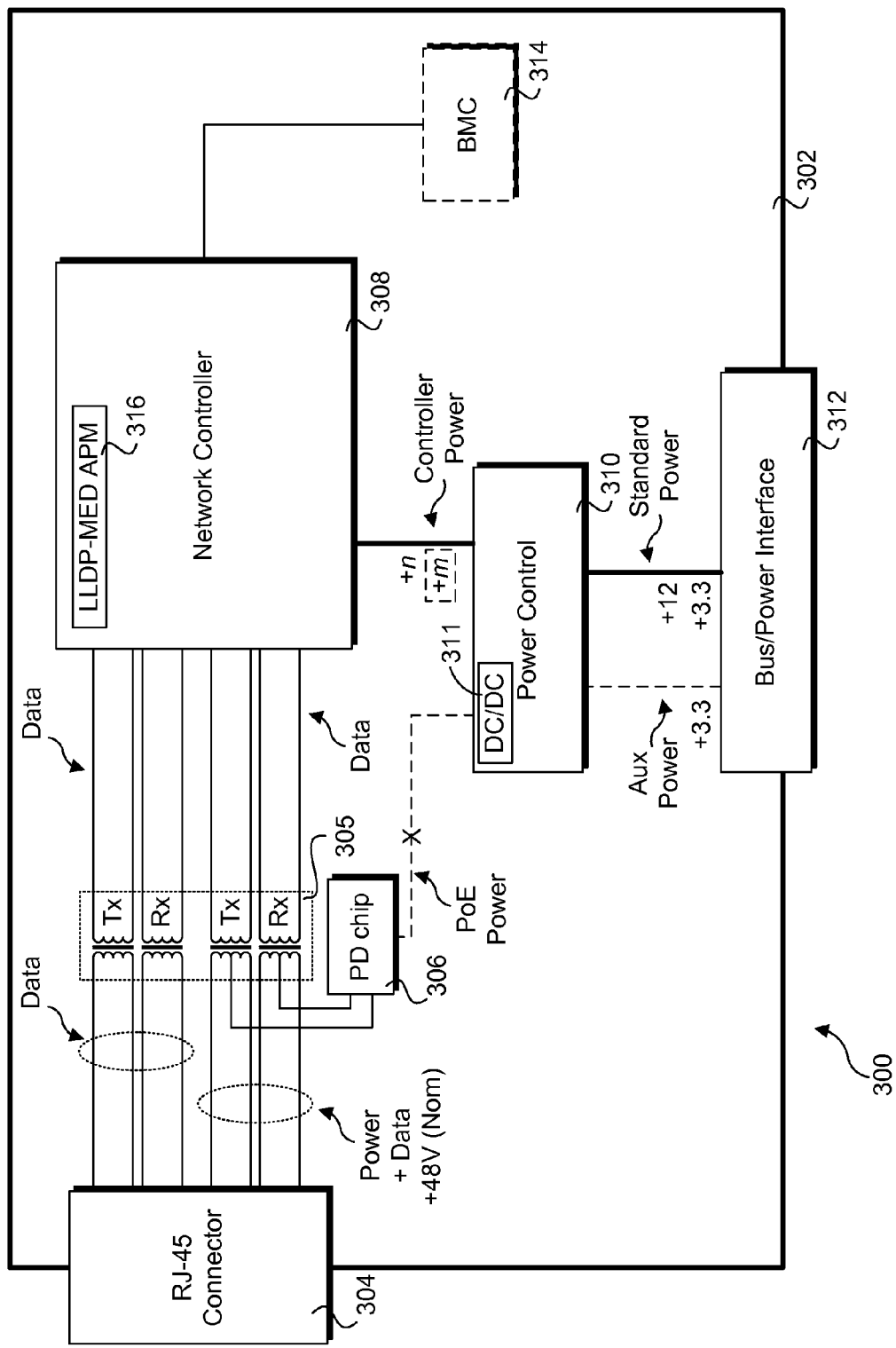
FIG. 3c is a schematic diagram illustrating a power input condition for the network interface architecture of FIG. 3 during a normal power state under which Standard Power is provided as an input to the power control component while no PoE power is provided as an input, according to one embodiment.

FIG. 3c depicts a Standard Power only implementation using network interface architecture 300. Under this power configuration, there is no PoE power input from PD chip 306. In one embodiment, the two lower signal pairs depicted as PoE (Power+Data) signals to which the PD chip 306's inputs are coupled are transmitted as conventional Ethernet signals. Under the original PoE standard, PSE's and PD's coupled via an Ethernet link negotiated whether to implement PoE during link initialization, with the negotiated PoE link state (active or inactive) being maintained until the link was disconnected or otherwise reset. Under PoE+, the PoE link state may be dynamically changed without resetting or disconnecting a link. In one implementation of the illustrated embodiment of FIG. 3c, the current PoE link state is inactive. Accordingly, all of the power inputs to power control 310 are provided as Standard Power. Optionally, a portion of the power input may be supplied as an Aux Power input.

In addition to implementing a no PoE power input configuration via use of an inactive PoE link state, other schemes may be used to obtain similar results with active PoE link states. For example if either the PoE signal inputs to PD chip 306 or the PoE power output from PD chip 306 are disconnected, no PoE power will be provided as an input to power control 310. As mentioned above, under the original PoE standard, the PoE link state was either active or inactive throughout the duration of a given connection. Under PoE+, not only can the link state be dynamically changed between inactive to active states during a connection, it can be dynamically changed between active states having different power levels. Also, since a PoE signal has a nominal voltage, the amount of power carried via the PoE signal will depend on the load the voltage is applied to, up to a maximum amperage capability of the PSE as defined by the applicable PoE link mode. By default, there will be a small load due to resistance in the Ethernet cable wires, and a closed circuit is present regardless of whether or not the center taps of the input windings of the transformers on the PD-side of the link are connected to a PD. Thus, a link may be operated using an active PoE state regardless to whether a PD is connected at the end station. In addition, there are some PSE devices that detect when a PD load has been removed, and automatically reduce power in their PoE signals in response to such conditions, and re-enable PoE power when a PD device is detected to be reconnected.

Figure 3D:
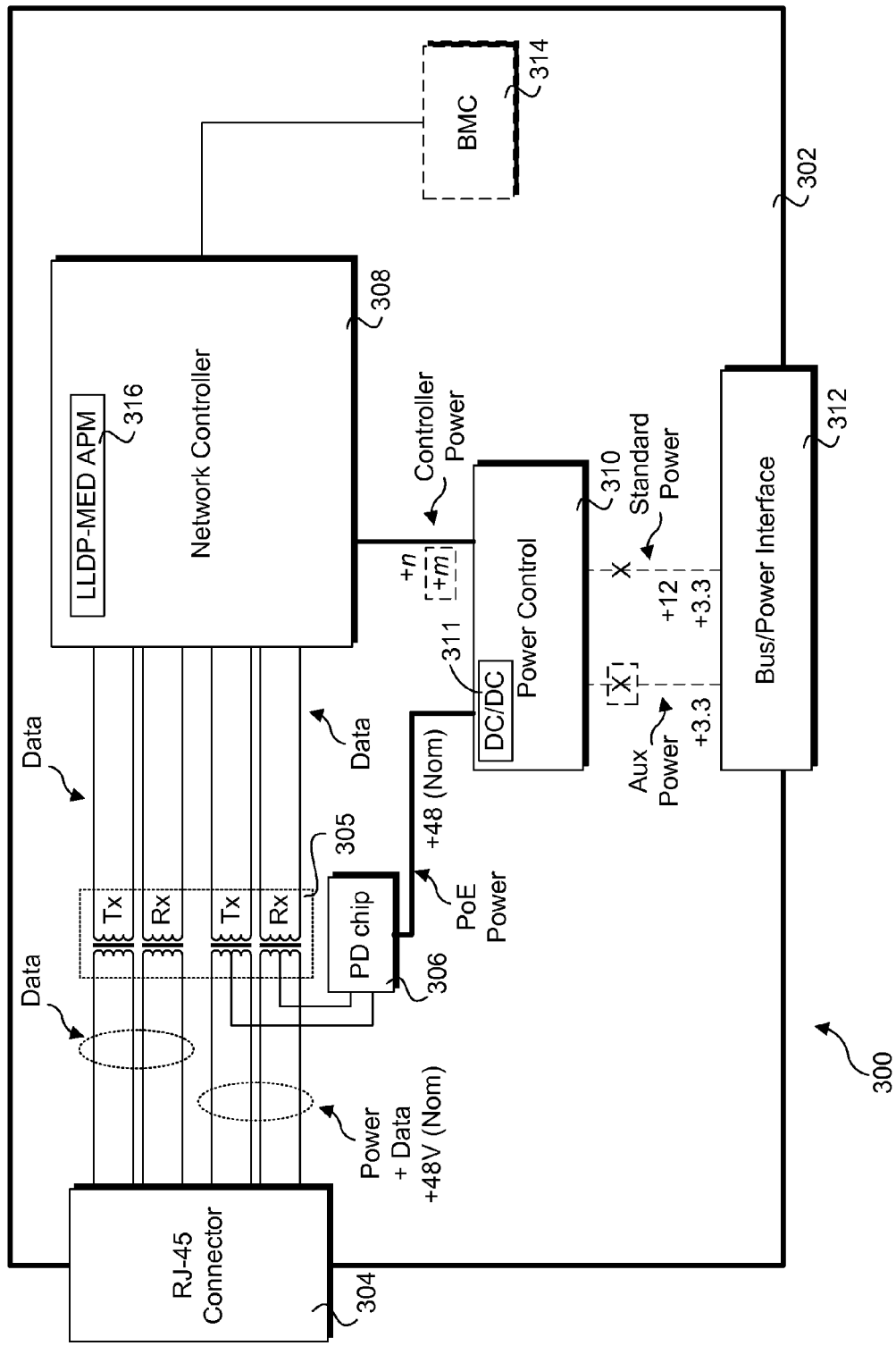
FIG. 3d is a schematic diagram illustrating a power input condition for the network interface architecture of FIG. 3 during a reduced power state under which Standard Power is unavailable as an input to the power control component and PoE power is employed to power the network controller, according to one embodiment.
Figure 3E:
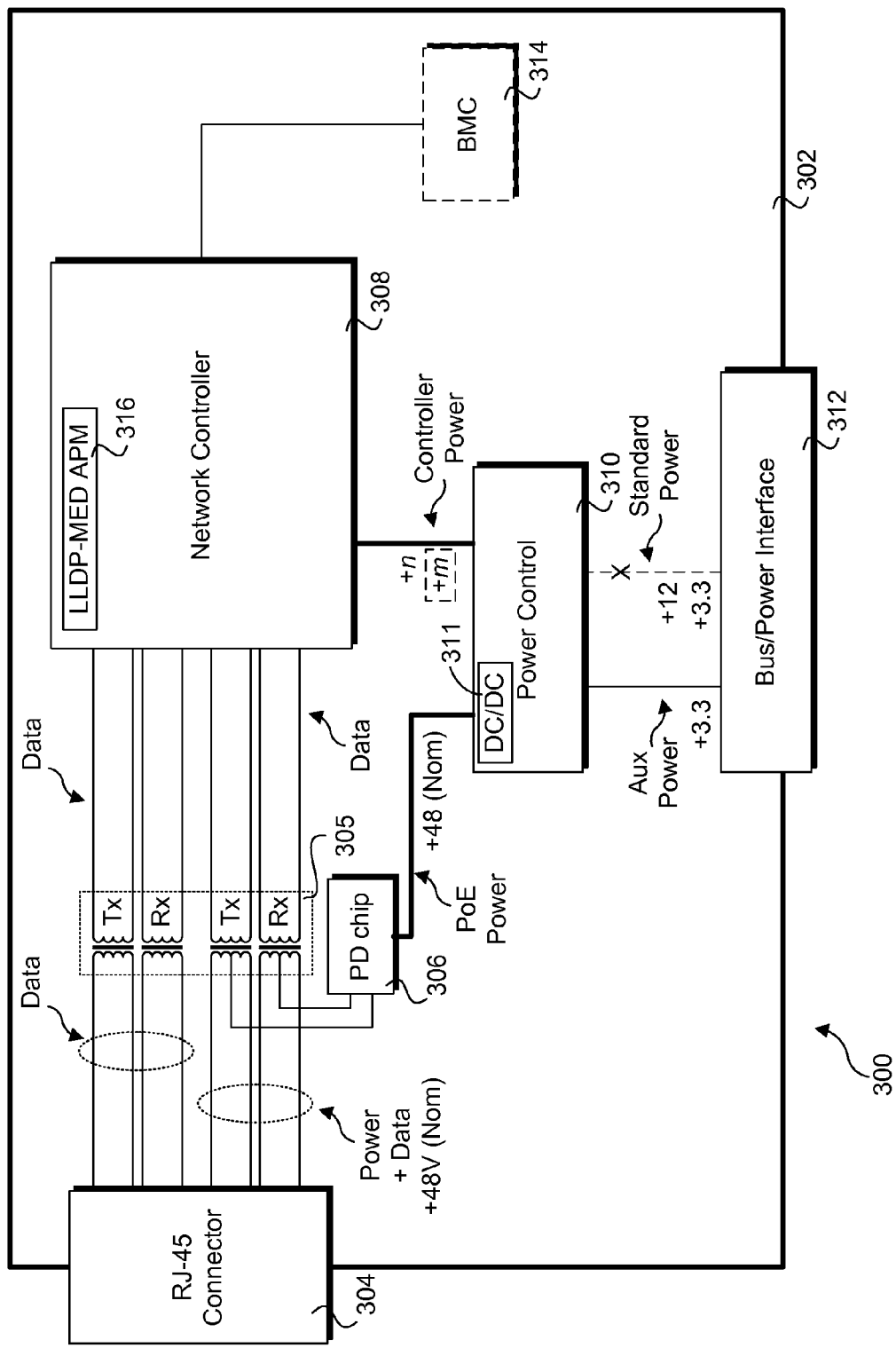
FIG. 3e is a schematic diagram illustrating a power input condition comprising a modification to the configuration of FIG. 3d under which a portion of input power is provided as an auxiliary power input.

FIG. 3d illustrates one embodiment of a PoE power only implementation for network interface architecture 300. Under this configuration, the PoE link state is active while there is no power supplied by either the standard power inputs or the auxiliary power input. The lack of Standard Power and/or Aux power input may be a result of the peripheral buses being put into a low-power or sleep state, or may be implemented using switches or other circuitry in power control 310 to effect disconnection of these power inputs. In an optional configuration, a power of the input power provided to power control 310 is provided via the Aux Power signal.

In some situations, it may be advantageous to use both Standard Power and PoE power, wherein the power supplied by one or both may be at normal or a reduced level. This is the configuration shown in each of FIGS. 3, 3a, and 3b. Under this configuration, the amount of power supplied via PoE Power or Standard Power may be controlled by appropriate logic and circuitry in power control 310, 310a, or 310b.

For example, in some embodiments a PoE+ link state may be initiated at a reduced power level relative to a maximum power level supported by a PoE+ power sourcing device. Under the PoE+, five power level classes (0, 1, 2, 3, and 4) are defined, with classes 1-4 being implemented. The description for power classes 1-4 are (respectively) very low power, low power, mid power, and high power. Upon Ethernet cable connection between a PoE power sourcing device and an end station, the PSE in the power sourcing device tests the link to determine if the end station includes a PD. If a PD is detected, the PSE powers up the PD (using a PoE power-carrying signal). Once the PD is powered, it identifies itself to the PSE along with its maximum power consumption and a requested maximum power level. The PSE returns a maximum power allowed value. In one embodiment, setting up a PoE link state is implemented using Ethernet layer 2 LLDP-MED (Link Layer Discovery Protocol with the Media Endpoint Discovery extension) Advanced Power Management (APM), as depicted by LLDP-MED APM blocks 316 in each of FIGS. 3 and 3a-e. During ongoing PoE link operations (i.e., during an existing link connection) the PoE power level may be renegotiated at 0.1 W steps.

Under a variable PoE power operation, an initial power level may be negotiated between a PoE power sourcing device and a powered end station and may be dynamically change without disconnecting the link connection. Under one embodiment, a very low or low (i.e., class 1 or 2) PoE link power state is initially negotiated, and a powered end station comprising an apparatus such as a network adaptor board or server blade will initially employ a Standard Power input during a normal operation state for the apparatus or a system hosting the apparatus (in the case of a network adaptor board). During ongoing operations, a reduced power state of the apparatus may be effected by renegotiating an increase in the power level of the PoE link state and employing the increased PoE power to supplement or replace the Standard Power input and/or an auxiliary power input (if available).

Figure 4:
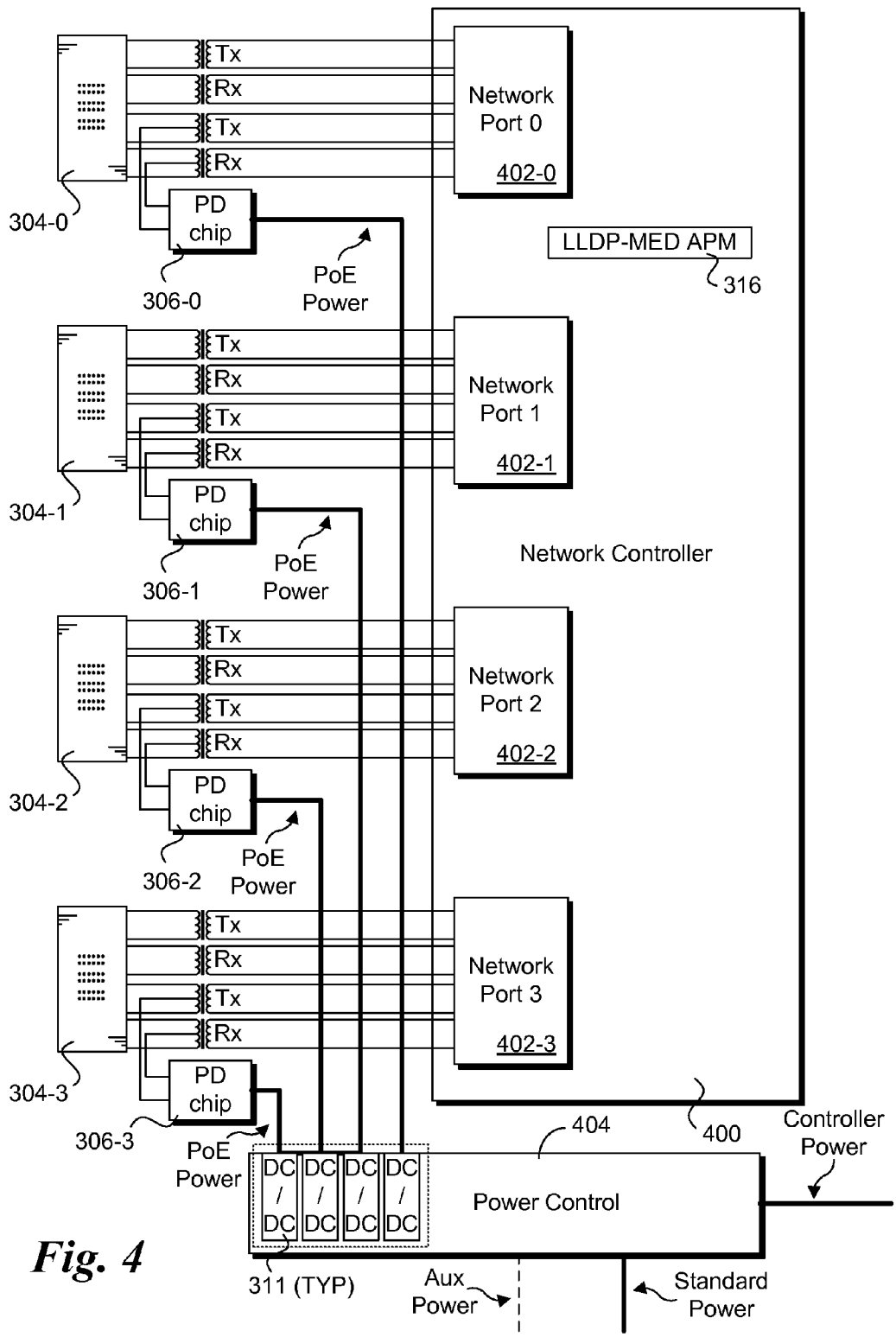
FIG. 4 is a schematic diagram of a PoE-enabled end station configured to receive multiple of PoE signals and employ PoE power provided by the multiple PoE signals to power a network controller when the end station or its host is operating in a reduced power state.

In addition to use of a single PoE signals, the principles and teachings herein may be implemented for power end devices receiving power via multiple PoE signals. For example, FIG. 4 shows an exemplary configuration under which a multi-port network controller 400 may receive PoE power input via one or more PoE signals. By way of illustration and not limitation, network controller is depicted as including four network ports 402, respectively labeled 402-0, 402-1, 402-2, and 402-3 (and also labeled Network Port 0-3). Each of network ports 402 is connected to a respective Ethernet jack 304. The configuration further includes a PD chip 306 and sets of coupling transformers that are configured in a similar manner to that shown in network interface architecture 300 of FIG. 3 to facilitate data signal coupling and PoE coupling for PoE signals received at each of the Ethernet jacks. The PoE Power output from each of PD chips 306 is received as power inputs by a power control 404. In the configuration illustrated in FIG. 4, power control 404 includes four DC/DC convertors 311. Optionally, a DC/DC convertor may be implemented in one or more of the PD chips.

Generally, in a multiple PoE signal implementation, the PoE power state for each network port may be configured in accordance with the PoE or PoE+ standard as if only a single PoE signal is used for the powered end station—that is, the PoE/PoE+ power aspects are handled separately. As each network port has its own MAC address, the aforementioned LLDP-MED APM protocol may be used to negotiate configuration of the PoE power received via the Ethernet jack connected to each network port that will be receiving a PoE signal. Under PoE+, the power level for each PoE signal may be dynamically adjusted while maintaining the link connection. It is noted here that it is possible that two or more PoE signals may be received from separate PoE power sourcing devices.

Under one embodiment, an augmentation to the PoE/PoE+ standards is implemented such that negotiation for the power level of two or more PoE signals transmitted from the same PoE power sourcing device is managed in a combined manner. This will involve augmentation to PoE negotiation logic as both ends of the link. Under one scheme, power configuration and negotiation for PoE signals received at multiple ports is handled via communication between the PoE power sourcing device and the powered end station using a single Ethernet link, e.g. via Ethernet jack 304-0. Under the combined management scheme, power negotiation can be handled via a single communication exchange, rather than requiring separate communication exchanges for each of the ports that will be receiving a PoE signal.

The configuration of FIG. 4 is generally illustrative of any powered end station implementation employing two or more PoE signals to power a network controller and/or related or similar networking components in a network adaptor board or computer system such as a server. Accordingly, for a powered end station providing N network ports, N or less of those network ports may be configured to receive PoE+ signals.

In one embodiment, aspects of the principles and teachings disclosed herein may be implemented in a network interface comprising a network adaptor card or the like. In another embodiment, the network interface may comprise a block of logic and circuitry implemented in a System on a Chip (SoC). In another embodiment, the network interface may comprise a network interface component implemented in a main board or motherboard of a computer system. In yet another embodiment, aspects of the principles and teachings may be implemented in a computer server such as server blade in a blade server.

As an overview, typical blade server components and systems are shown in FIGS. 5a-c, and 6. Under a typical configuration, a rack-mounted chassis 500 is employed to provide power and communication functions for a plurality of server blades (i.e., blades) 502, each of which occupies a corresponding slot. (It is noted that all slots in a chassis do not need to be occupied.) In turn, one or more chassis 500 may be installed in a blade server rack 503 shown in FIG. 5c. Each blade is coupled to an interface plane 504 (e.g., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 5A:
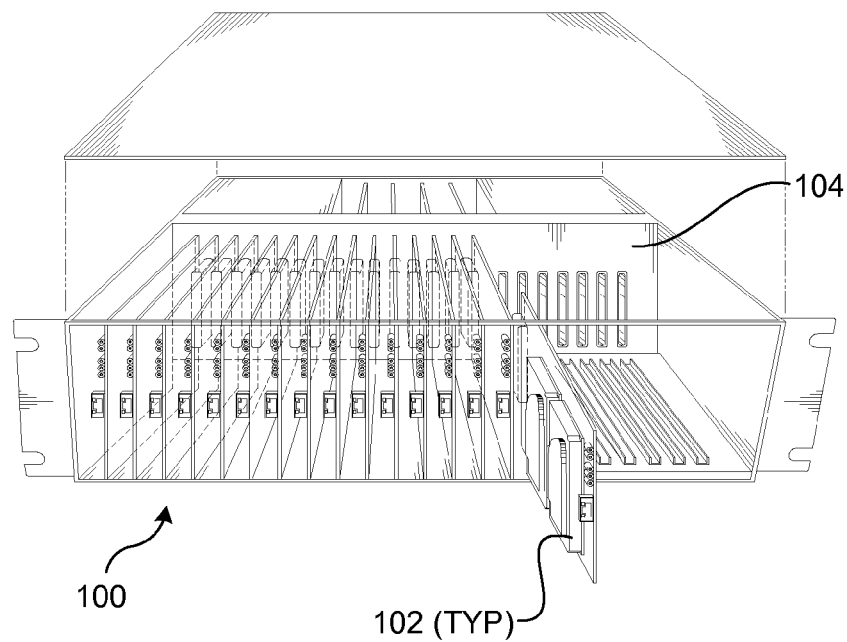
FIG. 5a is a frontal isometric view of an exemplary blade server chassis in which a plurality of server blades are installed.
Figure 5B:
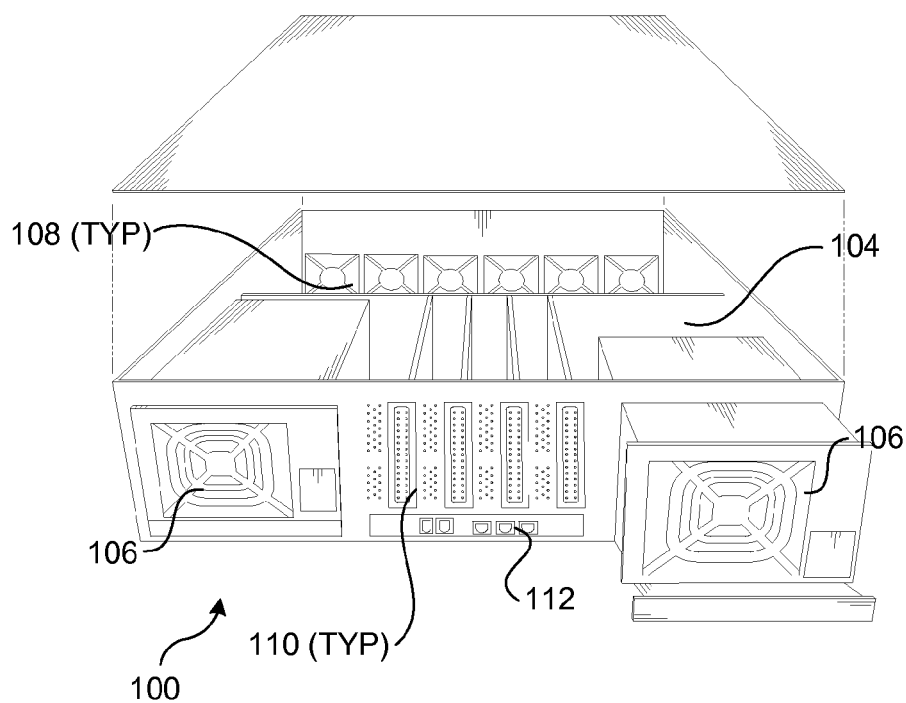
Figure 5C:
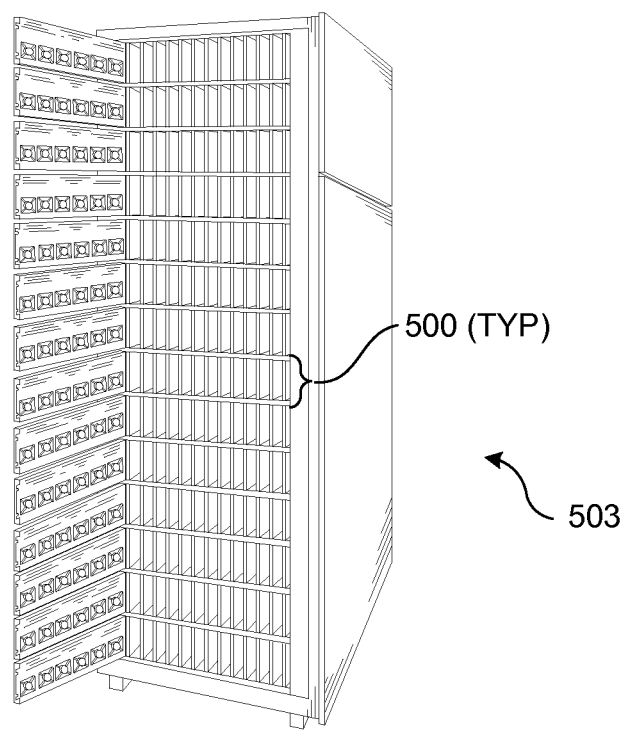
FIG. 5c is an isometric frontal view of an exemplary blade server rack in which a plurality of rack-mounted blade server chassis corresponding to FIGS. 16a and 16b are installed.

A typical mid-plane interface plane configuration is shown in FIGS. 5a and 5b. The backside of interface plane 504 is coupled to one or more power supplies 506. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 108 are employed to draw air through the chassis to cool the server blades.

An important feature required of blade servers is the ability to communication externally with other IT infrastructure. This may be facilitated via one or more network connect cards 510, each of which is coupled to interface plane 504, or via networking facilities integrated in a give blade. Generally, a network connect card may include a physical interface comprising a plurality of network port connections (e.g., RJ-45 jacks), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 512 that is coupled to the backside or frontside of the interface plane. As yet another option, a management or configuration server may be employed to manage blade activities, wherein communications are handled via standard computer networking infrastructure, for example, Ethernet.

Figure 6:
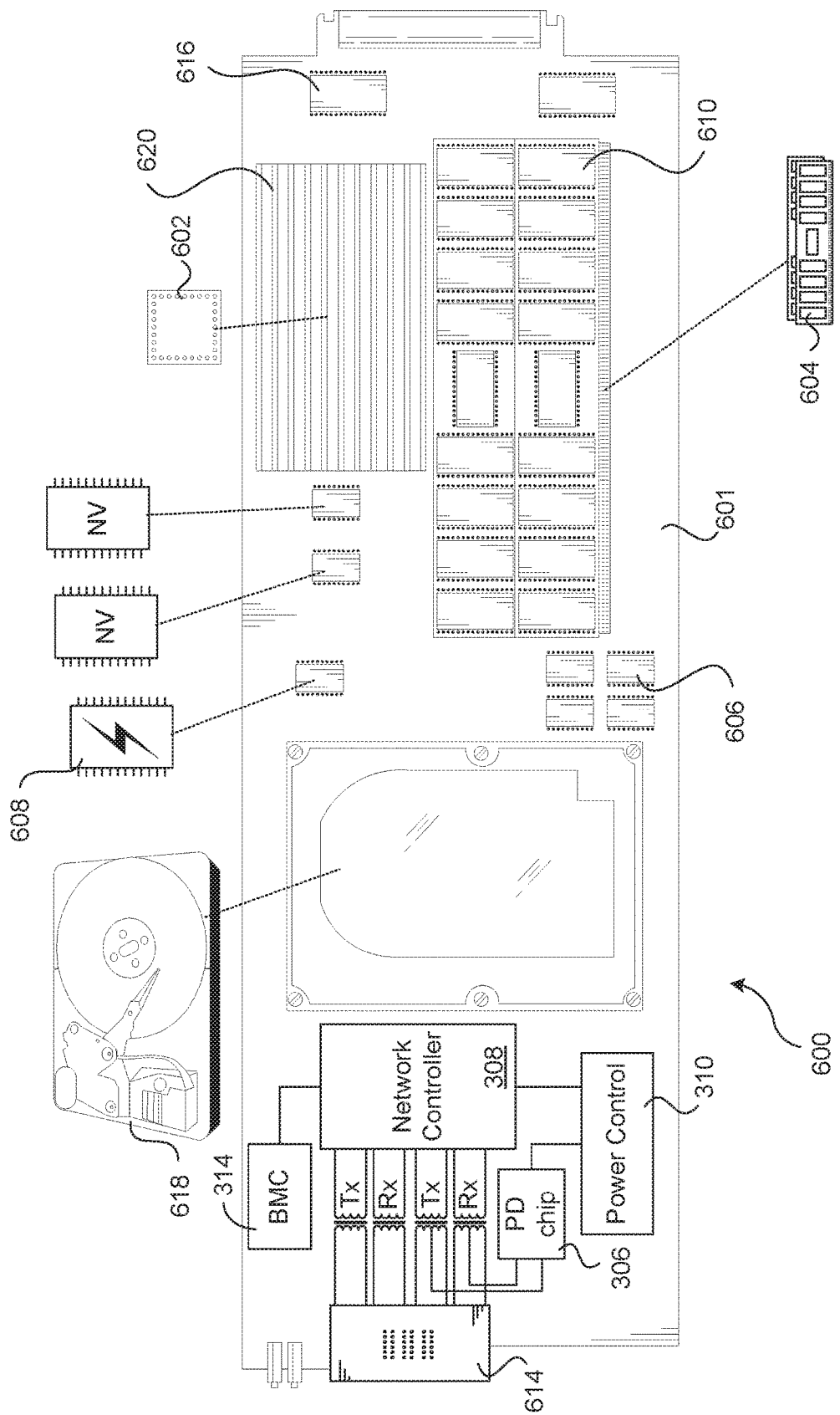
FIG. 6 shows details of the components of a typical server blade, according to one embodiment.

With reference to FIG. 6, further details of an exemplary blade 600 are shown. As discussed above, each blade comprises a separate computing platform that is configured to perform server-type functions, i.e., is a "server on a card." Accordingly, each blade includes components common to conventional servers, including a main printed circuit board (main board) 601 providing internal wiring (i.e., buses) for coupling appropriate integrated circuits (ICs) and other components mounted to the board. These components include one or more processors 602 coupled to system memory 604 (e.g., DDR3 (double data rate 3) RAM), cache memory 606 (e.g., SDRAM), and a firmware storage device 608 (e.g., flash memory). A "public" NIC (network interface controller) chip, depicted as network controller 308 is provided for supporting conventional network communication functions, such as to support communication between a blade and external network infrastructure. Other illustrated components with reference numbers include a BMC 314, a PD chip 306, a power control component 310, an Ethernet jack 614, and an interface plane connector 616. Additional components include various passive components (i.e., resistors, capacitors), power conditioning components, and peripheral device connectors.

Generally, each blade 600 may also provide on-board storage. This is typically facilitated via one or more built-in disk controllers and corresponding connectors to which one or more disk drives 618 are coupled. For example, typical disk controllers include serial ATA controllers, SCSI controllers, and the like. The disk drives may typically comprise a magnetic hard disk drive (as illustrated) or a solid state drive (SSD). As an option, the disk drives may be housed separate from the blades in the same or a separate rack, such as might be the case when a network-attached storage (NAS) appliance is employed for storing large volumes of data.

Blade 600 further is configured to employ PoE power as an auxiliary power input when the blade or selected components on the blade are operating in reduced power states. Generally, power control 310 will be coupled to a bus/power interface or power plane(s) that provide power to various components on blade 600. During operations in reduced power states, power normally supplied to selected board traces comprising power inputs from an internal bus or interconnect that are akin to connector pins on an external peripheral bus may be removed. For example, in one embodiment power control 310 is coupled to a PCIe interface that may be put into a lower power or sleep state during operation of blade 600.

As discussed above, aspects of the principles and teachings disclosed herein may be implemented on a network adaptor board. Typically, a network adaptor board may be configured as a peripheral "card" that is installed in an available slot on a peripheral bus of a computer system such as a server or desktop computer. As referred to herein, a network adaptor board may also be configured as a daughter board that is coupled to another computer system board, such as to a motherboard.

Figure 7:
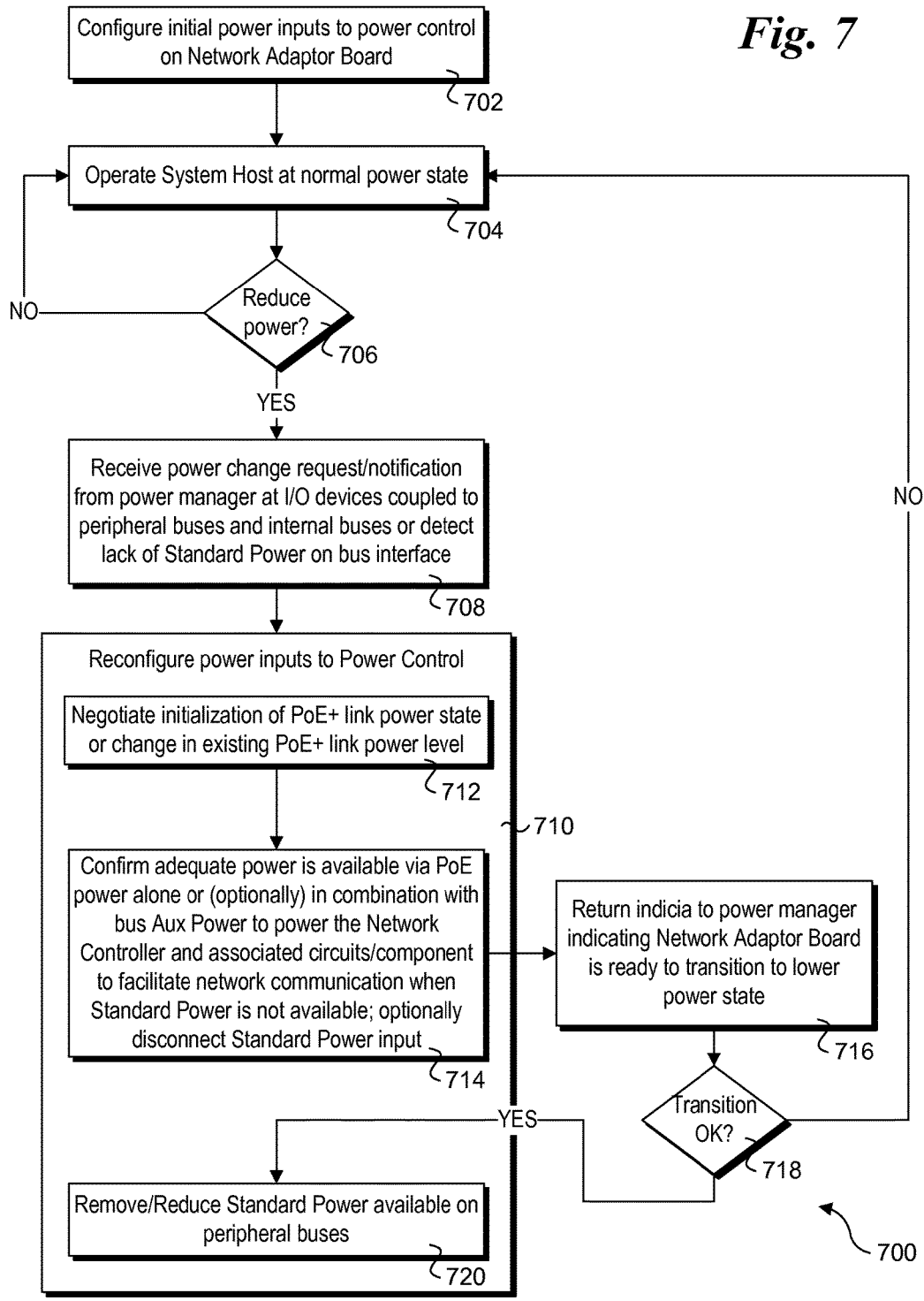
FIG. 7 is a flowchart illustrating operations and logic implemented for effecting a transition from a normal power state to a reduced power state for a host system including a network adaptor board that is powered by PoE power while in the reduced power state, according to one embodiment.

FIG. 7 shows a flowchart 700 comprising operations and logic for effecting a transition from a normal power state to a reduced power state for a host system including a network adaptor board that is powered by PoE power while in the reduced power state, according to one embodiment. The flowchart begins at a block 702, wherein initial power inputs are configured to the power control components on the network adaptor board, e.g., power control 310 in FIGS. 3 and 3a-3. For PoE implementations, this entails negotiations of a PoE signal power level (class). For a PoE+ implementation, negotiations for initializing a PoE signal may be made now or in block 712, as described below. By default, the primary power source for the network controller will be a Standard Power input which will be provided by voltages on applicable pins of a bus/power interface employed by the peripheral bus to which the network adaptor board is coupled via a corresponding connector, such as an edge connector.

During normal operations, the system host (e.g., the computer system the network adaptor board is installed in) will operate in a normal power state under which normal power levels will be provided to its peripheral buses. This condition is depicted in a block 704. In a block 706, a determination is made to whether power is to be reduced. Generally, this decision may be made on an ongoing or periodic basis, or as a result of a corresponding event (such as a request from a local or remote operator to put the system into a reduced power state).

In response to detection that transition from a normal to a reduced power state is to be effected, the logic proceeds to a block 708 under which the network adaptor board and other Input/Output (I/O) and/or peripheral devices receive a change power request or notification from a power manager (e.g., a power management agent in or external to the host's CPU), or optionally, the lack of Standard Power input at the bus interface is detected. Under some embodiments, a host system may employ a power management agent to coordinate power state changes with sub-systems, such as peripheral or I/O devices that may be coupled to a peripheral bus or coupled to buses in the systems main board. The two general schemes are to request a power state change and wait for confirmation that the power state change may be implemented, or to notify the subsystems that a power state change will be effected at some predetermined time offset (to enable the subsystems to prepare for the power state change).

The flowchart next proceeds to a block 710 in which power inputs to the power control component are reconfigured. This process involves multiple operations depicted in sub-blocks 712, 714, and 720. In sub-block 712, the initialization of a PoE+ link power state is negotiated, or if previously negotiated in block 702 a change in the link power level may be negotiated. Typically, the power link state will be negotiated to supply an adequate level of PoE power to power the network controller and associate circuits and components (as applicable) when Standby Power is removed, with the optional consideration of the availability of Aux power from the bus. Accordingly, in a block 702 a confirmation that adequate power is available via the PoE power alone or in combination with the Aux Power. As an option, the Standard Power input to the power control component may be disconnected.

For embodiments when power state change readiness for peripheral and I/O devices are confirmed, indicia is returned to the power manager indicating the peripheral or I/O device is ready for the change in power state. This will include receiving such indicia from the network adaptor board, as depicted in a block 716. Once readiness indicia is received from applicable peripheral and I/O devices, it is OK to transition, as depicted by a decision block 718. At this stage, transition of the power state is implemented by removing or reducing Standard Power voltage(s) available on the peripheral buses.

Figure 8:
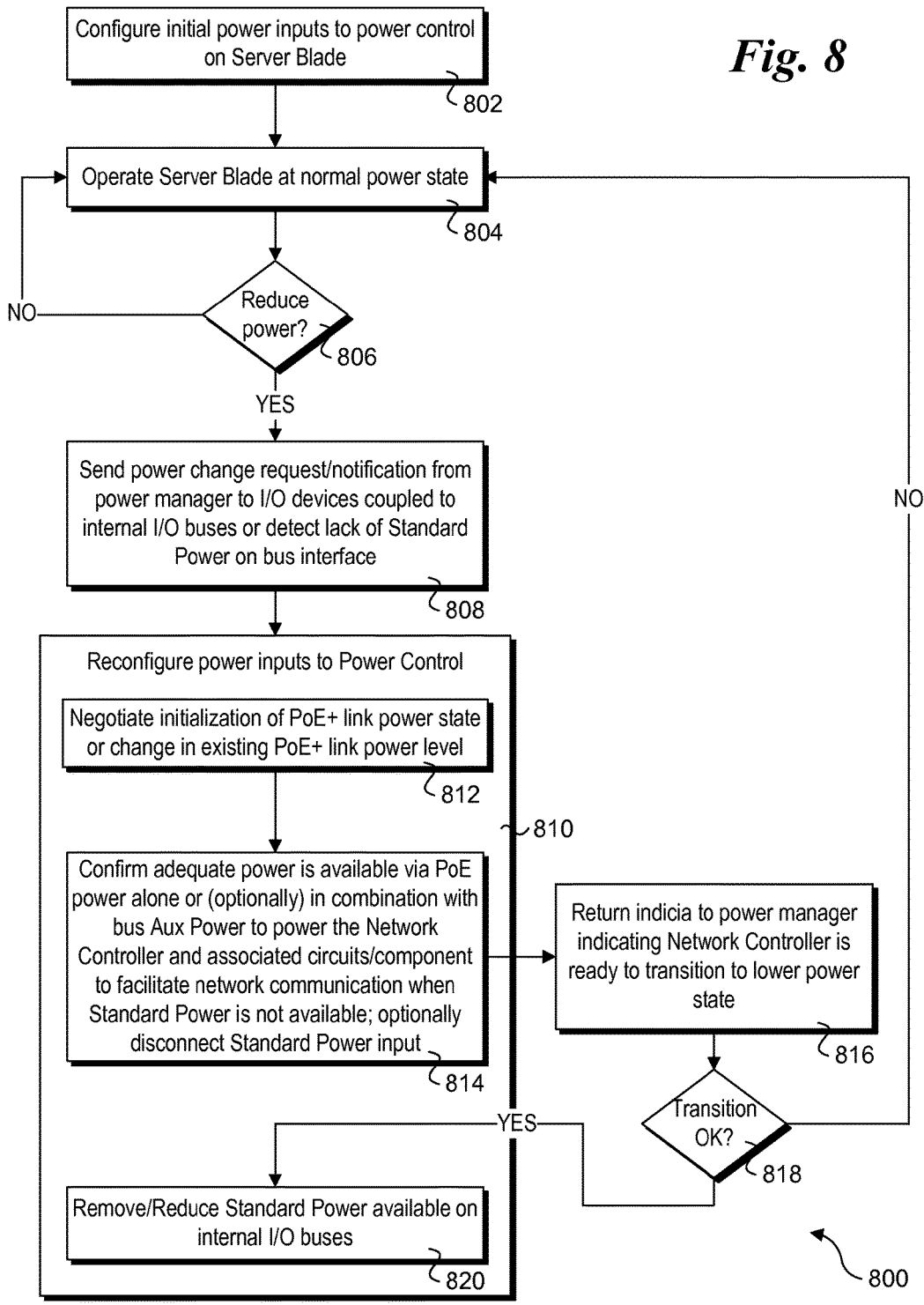
FIG. 8 is a flowchart illustrating operations and logic implemented for effecting a transition from a normal power state to a reduced power state for a server blade including a network controller that is powered by PoE power while in the reduced power state, according to one embodiment.

FIG. 8 shows a flowchart illustrating operations and logic implemented for effecting a transition from a normal power state to a reduced power state for a server blade including a network controller that is powered by PoE power while in the reduced power state, according to one embodiment. Generally, effecting power state changes as applied to a network controller in a server blade is similar to that employed for a network adaptor card. Accordingly, blocks in FIGS. 7 and 8 with reference numbers sharing the same last two digits perform similar operations (e.g., 702 and 802 are similar, 704 and 804 are similar, etc.) The primary difference is under a server blade the blade is the host system and a blade does not have external peripheral buses. Rather, peripheral and I/O devices such as a network controller or NIC are connected to internal buses or interconnect structures via routing traces embedded in the main board for the blade. Also, unlike a host system, a server blade does not have a power supply, and receives power input from a blade server chassis power supply. However, blade servers are enabled to control power levels available on their internal buses/interconnects.

As will be apparent to those having skill in the art, the teachings and principles disclosed herein may be implemented in network-related components to enable such components to operate when their associated host system or blade server is operating in a reduced power state. This is advantageous in that enables the host system or blade server to remove Standard Power supplied by its external or internal peripheral and I/O buses when operating in a reduced power state without losing network communication. As a result, remote operations may be implemented via a BMC or the like to manage the host system or blade server while in such reduced power states. This includes the ability to "wake" up the host or blade server via one or more applicable commands sent from a remote operator. Accordingly, power management of servers in data centers is enhanced, enabling servers to be taken off and put back online without shutting down the servers. In addition, this can be implemented for recently introduced 10 GbE network controllers, without having to provide a separate auxiliary power supply in the host.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

As used herein, a network controller may comprise one or more integrated circuits or one or more logic blocks on an integrated circuit that is/are configured to facilitate one or more of network access, control, and communication operations. In some embodiments, a network controller may comprise a Network Interface Controller (NIC) chip or the like. By example and without limitation, a network controller for an Ethernet link will comprise appropriate logic, buffers, and interfaces to facilitate communication using an Ethernet, including a PHY layer, MAC layer, and additional layers depending on what type of communication protocols are supported (e.g., IP layer, TCP layer, etc.).

In addition, embodiments of the integrated circuit aspects of the present description may be implemented not only within one or more semiconductor chips, but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:
1. A method, comprising:
employing a standard power input at a power control component in a network interface to supply power to a network controller on the network interface when the network interface is installed in a host computer system that is operating at a normal power state;

negotiating a Power over Ethernet (PoE) link power state with a PoE power sourcing equipment (PSE) device coupled in communication with the network interface via a first Ethernet link coupled to a first Ethernet jack of the network interface;

inductively coupling PoE power transferred to the network interface via the first Ethernet link to a powered device (PD) component, the PD component outputting PoE power in response thereto;

employing the PoE power output by the PD component to supply power to the network controller when the host computer system is operating at a reduced power state under which the standard power input is not employed to supply power to the network controller;

negotiating a first PoE link power state between the PSE and the PD component on the network interface;

employing a first level of PoE power output by the PD component when the first Ethernet link is operating in the first PoE link power state to supply power to the network controller when operating at the normal power state;

negotiating a second PoE link power state between the PSE and the PD component, the second PoE link power state being greater than the first PoE link power state; and employing a second level of PoE power output by the PD component when the link is operating in the second PoE link power state to supply power to the network controller when operating at the reduced power state, wherein negotiating the POE link power state is performed using an Ethernet Layer 2 protocol transferred over the first Ethernet link.

2. The method of claim 1, further comprising:

receiving a request from a requesting component to change a power state for at least one of the network interface or the host computer system from a normal power state to a reduced power state; and in response thereto, negotiating the PoE link power state and employing the PoE power output by the PD component to supply power to the network controller; and indicating to the requester that the power state may be changed.

3. The method of claim 1, further comprising:

in connection with effecting a power state change of the host computer system back to the normal operating state from a reduced power state, negotiating a PoE link power state change with the PoE PSE device from a current PoE link power state to a reduced PoE link power state.

4. The method of claim 1, further comprising disconnecting the standard power input to the power control component after the PoE power output by the PD component is able to supply power to the network controller.

5. The method of claim 1, wherein the further comprising:

employing power received at the power control component as an auxiliary power input to supply a portion of the power supplied to the network controller when the host computer system is operating at a reduced power state.

6. An apparatus, comprising:

a main board having a bus interface configured to receive a standard power input comprising at least one voltage level when the apparatus is installed in a host computer system and operating at a normal power state;

a first Ethernet jack, coupled to the main board, having a plurality of pins and configured to facilitate a connection to a first Ethernet cable comprising four twisted pairs of wire;

a plurality of coupling transformers including windings connected to associated pairs of pins on the Ethernet jack and configured to inductively couple data signals sent to and received from a Power over Ethernet (PoE) power sourcing device linked in communication with the apparatus via the first Ethernet cable when the first Ethernet cable is coupled to the first Ethernet jack and when a first Ethernet link between the apparatus and the PoE power sourcing device and implemented via the first Ethernet cable is active;

a PoE Powered Device (PD) component, having inputs configured to receive PoE power coupled from a PoE signal as voltage signals and generate a PoE power output at an output when the PoE signal is received from the PoE power sourcing device via the first Ethernet cable;

a power control component configured to generate a power output in response to one or more power inputs, having a first input coupled to the bus interface and a second input coupled to the output of the PD component;

a network controller, coupled to a power output of the power control component and configured to receive and transmit data signals via the plurality of coupling transformers; and a baseboard management controller (BMC) operatively coupled to the network controller, wherein the apparatus is configured to, receive at the BMC, while operating in a reduced power state, data comprising a command to switch operation of the apparatus or host computer system to a normal power state; and, in response thereto, configure the apparatus such that the standard power input is used as a power input by the power control component, and wherein the power control component is configured to employ at least the standard power input when the apparatus is operated at a normal power state, wherein the power control component is configured to employ the PoE power output from the PD component as a power input when the apparatus is operating at a reduced power state, and wherein data signals are enabled to be received and transmitted over all four twisted pairs of wire in the first Ethernet cable.

7. The apparatus of claim 6, wherein the apparatus is configured to perform operations, when operating, comprising:

at least one of receiving a signal indicating a power level of the apparatus is to be reduced or detecting a reduced power level available at the bus interface; and, in response thereto, configuring the apparatus such that the power control component employs the PoE power output as a power input.

8. The apparatus of claim 7, wherein the apparatus is configured to employ the PoE power output as a power input to the power control component by performing operations comprising:

negotiating, with the PoE power sourcing device, at least one of activation of a PoE power state or change in a power level of an existing PoE link power state while an established Ethernet link between the PoE power sourcing device and apparatus and implemented via the first Ethernet cable is operating, wherein negotiating that at least one of activation of the PoE power state or change in a power level of an existing PoE link power state is implemented using an Ethernet Layer 2 protocol.

9. The apparatus of claim 7, wherein the apparatus is configured to employ the PoE power output as a power input to the power control component by performing operations comprising:

switchably coupling a PoE power output from the PD component as a power input to the power control component.

10. The apparatus of claim 7, wherein the apparatus is configured to employ the PoE power output as a power input to the power control component by performing operations comprising:

switchably coupling the second set of inductive coupling elements to inputs of the PD component.

11. The apparatus of claim 7, wherein the apparatus is further configured to employ an auxiliary power input voltage received via the bus interface when one of the apparatus the host system is operating at a reduced power state.

12. The apparatus of claim 6, wherein the apparatus is configured to perform further operations comprising:

configuring the apparatus such that it does not employ the PoE power as a power input to the power control component.

13. A method, comprising:

employing a standard power input at a power control component in a server blade to supply power to a network controller on the server blade server when the server blade is installed in a blade server rack and is operating at a normal power state;

negotiating a Power over Ethernet (PoE) link power state with a PoE power sourcing equipment (PSE) device coupled in communication with the network interface via a first Ethernet link coupled to a first Ethernet jack of the network interface;

inductively coupling PoE power transferred to the network interface via the first Ethernet link to a powered device (PD) component, the PD component outputting PoE power in response thereto;

employing the PoE power output by the PD component to supply power to the network controller when the server blade is operating at a reduced power state under which the standard power input is not employed to supply power to the network controller;

negotiating a first PoE link power state between the PSE device and the PD component on the server blade;

employing a first level of PoE power output by the PD component when the link is operating in the first PoE link power state to supply power to the network controller when operating at the normal power state;

negotiating a second PoE link power state between the PSE device and the PD component, the second PoE link power state being greater than the first PoE link power state; and employing a second level of PoE power output by the PD component when the link is operating in the second PoE link power state to supply power to the network controller when the server blade is operating at the reduced power state, wherein negotiating the POE link power state is performed using an Ethernet Layer 2 protocol transferred over the first Ethernet link.

14. The method of claim 13, further comprising:

receiving a request from a requesting component to reduce a power level of input power supplied on a bus or interconnect via which the power control component receives a standard power input when the server blade is operating at a normal power state; and in response thereto, negotiating the PoE link power state and employing the PoE power output by the PD component to supply power to the network controller; and indicating to the requester that the power level may be changed.

15. The method of claim 13, further comprising:

in connection with effecting a power state change of the server blade back to the normal operating state from a reduced power state, negotiating a PoE link power state change with the PoE PSE device from a current PoE link power state to a reduced PoE link power state, wherein the PoE link power state change is negotiated over the first Ethernet link.

16. The method of claim 13, further comprising:

disconnecting the standard power input to the power control component after the PoE power output by the PD component is able to supply power to the network controller.

17. The method of claim 13, further comprising:

employing power received at the power control component as an auxiliary power input to supply a portion of the power supplied to the network controller when the server blade is operating at a reduced power state.

18. A server blade, comprising:

a main board having a bus interface configured to receive a standard power input comprising at least one voltage level when the server blade is installed in a blade server rack that is operating at a normal power state;

an Ethernet jack, coupled to the main board, having a plurality of pins and configured to facilitate a connection to an Ethernet cable comprising four twisted pairs of wire;

a plurality of coupling transformers including windings connected to associated pairs of pins on the Ethernet jack and configured to inductively couple data signals sent to and received from a Power over Ethernet (PoE) power sourcing device linked in communication with the server blade via an Ethernet cable when the Ethernet cable is coupled to the Ethernet jack and when an Ethernet link between the server blade and the PoE power sourcing device is active;

a PoE Powered Device (PD) component, having inputs configured to receive PoE power inductively coupled from a PoE signal transferred via the Ethernet cable as voltage signals and generate a PoE power output at an output when the PoE signal is received from the PoE power sourcing device via the Ethernet cable;

a power control component configured to generate a power output in response to one or more power inputs, having a first input coupled to the bus interface and a second input coupled to the output of the PD component; and a network controller, coupled to a power output of the power control component and configured to receive and transmit data signals via the plurality of coupling transformers; and a baseboard management controller (BMC) operatively coupled to the network controller, wherein the apparatus is configured to, receive at the BMC, while operating in a reduced power state, data comprising a command to switch operation of the apparatus or host computer system to a normal power state; and, in response thereto, configure the server blade such that the standard power input is used as a power input by the power control component, and wherein the power control component is configured to employ at least the standard power input when the server blade is operated at a normal power state, and wherein the power control component is configured to employ the PoE power output from the PD component as a power input when the server blade is operated at a reduced power state, and wherein the server blade is configured to negotiate a level of PoE power transferred from the PSE using an Ethernet layer 2 protocol comprising data sent over the Ethernet cable.

19. The server blade of claim 18, wherein the server blade is configured to perform operations, when operating, comprising:

determining that a power state change to a lower power state for at least a portion of components of the server blade is to be effected and, in response thereto, configuring the server blade such that the power control component employs the PoE power signal as a power input.

20. The server blade of claim 19, wherein the server blade is configured to employ the PoE power output as a power input to the power control component by performing operations comprising:

negotiating, with the PoE power sourcing device, at least one of activation of a PoE power state or change in a power level of an existing PoE link power state while an established Ethernet link between the PoE power sourcing device and server blade is operating.

21. The server blade of claim 19, wherein the server blade is configured to employ the PoE power output as a power input to the power control component by performing operations comprising:

switchably coupling a PoE power output from the PD component as a power input to the power control component.

22. The server blade of claim 19, wherein the server blade is configured to employ the PoE power output as a power input to the power control component performing operations comprising:

switchably coupling the second plurality of coupling transformers to inputs of the PD component.

23. The server blade of claim 19, wherein the power control component is further configured to employ an auxiliary power input voltage received as an input as one of the power inputs used to generate its power output when the server blade is operating in the reduced power state.

24. The server blade of claim 18, wherein the server blade is configured to perform further operations comprising:

configuring the server blade such that it does not employ the PoE power as a power input to the power control component when the server blade is operated in a normal power state.

25. The method of claim 1, wherein negotiation of the power state is implemented using Ethernet Layer 2 LLDP-MED (Link Layer Discovery Protocol with the Media Endpoint Discovery extension) Advanced Power Management.

26. The method of claim 1, wherein the network interface includes first and second Ethernet jacks, the first Ethernet jack is connected to the first Ethernet link, and the second Ethernet jack is connected to a second Ethernet link, wherein respective first and second PoE signals are transferred from at least one PSE device over the first and second Ethernet links, and wherein the method further comprises coupling PoE power transferred via the second PoE signal to the network interface via the second Ethernet link to the PD component.

27. The method of claim 1, wherein the first and second PoE signals are transferred from a single PSE device, and negotiation of the power state for each of the first and second PoE signals is implemented over only one of the first and second Ethernet links.

28. The apparatus of claim 6, wherein negotiation of the power state is implemented using Ethernet Layer 2 LLDP-MED (Link Layer Discovery Protocol with the Media Endpoint Discovery extension) Advanced Power Management.

29. The apparatus of claim 6, wherein the network interface includes first and second Ethernet jacks, the first Ethernet jack is connected to the first Ethernet link, and the second Ethernet jack is connected to a second Ethernet link, wherein respective first and second PoE signals are transferred from at least one PSE device over the first and second Ethernet links, and wherein the apparatus is further configured to inductively couple PoE power transferred via the second PoE signal to the network interface to the PD component.

30. The method of claim 13, wherein negotiation of the power state is implemented using Ethernet Layer 2 LLDP-MED (Link Layer Discovery Protocol with the Media Endpoint Discovery extension) Advanced Power Management.

31. The method of claim 13, wherein the network interface includes first and second Ethernet jacks, the first Ethernet jack is connected to the first Ethernet link, and the second Ethernet jack is connected to a second Ethernet link, wherein respective first and second PoE signals are transferred from at least one PSE device over the first and second Ethernet links, and wherein the method further comprises coupling PoE power transferred via the second PoE signal to the network interface via the second Ethernet link to the PD component.

32. The server blade of claim 18, wherein data signals are enabled to be received and transmitted over all four twisted pairs of wire in the Ethernet cable.

* * * * *